United States Patent
Schuba et al.

(10) Patent No.: US 8,037,279 B2
(45) Date of Patent: Oct. 11, 2011

(54) METHOD AND SYSTEM FOR CROSS-DOMAIN DATA SHARING

(75) Inventors: Christoph L. Schuba, Mountain View, CA (US); John B. Levon, Manchester (GB)

(73) Assignee: Oracle America, Inc., Redwood City, CA (US)

( * ) Notice: Subject to any disclaimer, the term of this patent is extended or adjusted under 35 U.S.C. 154(b) by 674 days.

(21) Appl. No.: 12/138,106

(22) Filed: Jun. 12, 2008

(65) Prior Publication Data

US 2009/0313446 A1    Dec. 17, 2009

(51) Int. Cl.
G06F 13/00 (2006.01)
G06F 13/28 (2006.01)
G06F 12/00 (2006.01)
G06F 15/16 (2006.01)
G06F 9/46 (2006.01)

(52) U.S. Cl. ........... 711/203; 711/147; 711/E12.002; 709/245; 709/246; 718/104

(58) Field of Classification Search .......... 711/203, 711/147, E12.002; 709/245, 246; 718/104
See application file for complete search history.

(56) References Cited

U.S. PATENT DOCUMENTS

| | | | |
|---|---|---|---|
| 4,144,522 A | 3/1979 | Kageyama et al. |
| 5,129,085 A | 7/1992 | Yamasaki et al. |
| 5,155,847 A | 10/1992 | Kirouac et al. |
| 5,371,885 A | 12/1994 | Letwin |
| 5,403,639 A | 4/1995 | Belsan et al. |
| 5,410,667 A | 4/1995 | Belsan et al. |
| 5,675,802 A | 10/1997 | Allen et al. |
| 5,819,292 A | 10/1998 | Hitz et al. |
| 6,209,111 B1 | 3/2001 | Kadyk et al. |
| 6,341,341 B1 | 1/2002 | Grummon et al. |
| 6,728,922 B1 | 4/2004 | Sundaram et al. |
| 6,745,284 B1 | 6/2004 | Lee et al. |
| 6,745,305 B2 | 6/2004 | McDowell |
| 6,789,156 B1 * | 9/2004 | Waldspurger ................ 711/6 |
| 6,795,966 B1 | 9/2004 | Lim et al. |
| 6,829,617 B2 | 12/2004 | Sawdon et al. |
| 6,857,001 B2 | 2/2005 | Hitz et al. |
| 6,892,211 B2 | 5/2005 | Hitz et al. |

(Continued)

OTHER PUBLICATIONS

Austin, B.; "A Dynamic Disc Allocation Algorithm Designed to Reduce Fragmentation During File Reloading"; Information Sciences Laboratory, Corporate Research and Development Center, General Electric Company, 1970 (4 Pages).

(Continued)

*Primary Examiner* — Edward Dudek, Jr.
(74) *Attorney, Agent, or Firm* — Osha • Liang LLP

(57) ABSTRACT

A method for sharing data between a first domain and a second domain, including issuing a first request for data from a storage pool by the first domain, receiving the first request by a control domain driver in a control domain, obtaining the data by the control domain driver, storing a first copy of the data in shared memory at a first physical address, updating a hypervisor page map to include an entry associating a first pseudo-physical page number with the first physical address, notifying the first domain that the first request has been completed, issuing a second request for the data by the second domain, receiving the second request by the control domain driver, determining that the first copy of the data is present in the shared memory, and updating the hypervisor page map to include an entry associating the second pseudo-physical page number with the first physical address.

20 Claims, 10 Drawing Sheets

U.S. PATENT DOCUMENTS

| | | | |
|---|---|---|---|
| 7,007,196 | B2 | 2/2006 | Lee et al. |
| 7,032,154 | B2 | 4/2006 | Kidorf et al. |
| 7,043,677 | B1 | 5/2006 | Li |
| 7,133,964 | B2 | 11/2006 | Rodrigues et al. |
| 7,162,486 | B2 | 1/2007 | Patel et al. |
| 7,174,352 | B2 | 2/2007 | Kleiman et al. |
| 7,200,715 | B2 | 4/2007 | Kleiman et al. |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0084242 | A1 | 5/2003 | Strange et al. |
| 2003/0126107 | A1 | 7/2003 | Yamagami |
| 2003/0145167 | A1 | 7/2003 | Tomita |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1 | 1/2005 | Silvers et al. |
| 2005/0097270 | A1 | 5/2005 | Kleiman et al. |
| 2005/0235154 | A1 | 10/2005 | Serret-Avila |
| 2006/0218644 | A1 | 9/2006 | Niles et al. |
| 2007/0078988 | A1* | 4/2007 | Miloushev et al. ............ 709/227 |
| 2009/0025007 | A1* | 1/2009 | Hara et al. ..................... 718/105 |
| 2009/0287901 | A1* | 11/2009 | Abali et al. ..................... 711/206 |

OTHER PUBLICATIONS

Goodheart, N. et al.; "The Magic Garden Explained"; Prentice Hall, 1994 (8 Pages).

Stallings, W.; "Computer Organization and Architecture: Designing for Performance"; Prentice Hall, 2000 (4 Pages).

Sanberg, R. et al.; "Design and Implementation of the Sun Network Filesystem"; Sun Microsystems, Inc., in Summer USENIX Conference Proceedings, Portland, OR, 1985 (12 Pages).

McKusick, M. K. et al.; "A Fast File System for UNIX"; ACM Transaction on Computer Systems, vol. 2, No. 3, Aug. 1984, pp. 181-197 (17 Pages).

Ashtrahan, M. M. et al.; System R: Relation Approach to Database Management; ACM Transactions on Database Systems, vol. 1, No. 2, Jun. 1976, pp. 97-137 (41 Pages).

"VERITAS File System 3.4 Administrator's Guide" Veritas Software Corporation, Nov. 2000, http://www.veritas.com; pp. 1-227 (227 Pages).

Czezatke, C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 Pages).

Osorio, N. et al.; "Guidelines for Using Snapshot Storage Systems for Oracle Databases"; Oracle Corporation, Oct. 2001 (13 Pages).

Quinlan, S.; "A Cached WORM File System"; AT&T Bell Laboratories, Murry Hill, New Jersey; Software-Practice and Experience, vol. 21 (12), pp. 1289-1299, Dec. 1991 (11 Pages).

Sun StorEdge Instant Image 2.0 System Administrators Guide; Sun Microsystems, Inc., Feb. 2000, Revision A (106 Pages).

Ylonen, T.; "Concurrent Shadow Paging: A New Direction for Database Research"; Laboratory of Information Processing Science, Helsinki University of Technology, SF-02150, Espoo, Finland, 1992 (8 Pages).

Popek, G. et al.; "The LOCUS Distributed System Architecture"; The MIT Press, Cambridge, Massachusetts, 1985 The Massachusetts Institute of Technology (8 Pages).

Gray, J. et al.; "The Recovery Manager of the System R Database Manager"; Computing Surveys, vol. 13, No. 2, Jun. 1981 (20 Pages).

Schilling, J.; "Enrwurf und Implementierung eines schnellen Filesystems fur UNIX unter bedonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 Pages).

Ylonen, T.; "Concurrent Shadow Paging: Snapshots, Read-Only Transactions, and On-The-Fly Multi level Incremental Dumping"; Laboratory of Information Processing Science, Helsinki University of Technology, FIN-02150, Espoo, Finland, 1993 (22 Pages).

"The Enterprise Challenge Served by Snapshot"; Whitepaper, 2001 LSI Logic Corporation (8 Pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 Pages).

Suresh, Babu S.; "Persistent Snapshots"; Department of Computer Science and Automation, Indian Institute of Science, Bangalore— 560 012, Jan. 2000 (38 Pages).

"Proceedings of the 5th Annual Linux Showcase & Conference" USENIX Association, Oakland, California, Nov. 5-10, 2001 (11 Pages).

Borg, A. et al.; "Fault Tolerance Under UNIX"; ACM Transactions on Computer Systems, vol. 7, No. 1, Feb. 1989, pp. 1-24 (24 Pages).

Rosenblum, M. et al.; "The Design and Implementation of a Log-Structured File System"; Electrical Engineering and Computer Sciences, Computer Science Division, University of California, 1991 (5 Pages).

Hecht, M. S. et al.; "Shadowed Management of Free Disk Pages with a Linked List"; ACM Transactions on Database Systems, vol. 8, No. 4, Dec. 1983, pp. 503-514 (12 Pages).

Rosenblum, M. et al.; "The LFS Storage Manager" Computer Science Division, Electrical Engineering and Computer Sciences, university of California; presented at the Summer '90 USENIX Technical Conference, Anaheim, California, Jun. 1990 (16 Pages).

Lorie, R. A.; "Physical Integrity in a Large Segmented Database"; ACM Transactions on Database Systems, vol. 2, No. 1, Mar. 1997, pp. 91-104 (14 Pages).

Johnson, J. E. et al.; "Overview of the Spiralog File System", Digital Technical Journal, vol. 8, No. 2, 1996, pp. 5-14 (10 Pages).

Santry, D. S. et al; "Deciding When to Forget in the Elephant File System"; 17th ACM Symposium on Operating Systems Principles (SOSP '99), Dec. 1999; pp. 110-123 (14 Pages).

Chutani, S. et al., "The Episode File System"; Proceedings of the 1992 USENIX Winter Technical Conference; 1992; (18 Pages).

Seltzer, M. L.; "File System Performance and Transaction Support"; University of California at Berkeley, 1992 (131 Pages).

Lascu, Octavian; "Configuration and Tuning GPFS for Digital Media Environments"; IBM; ibm.com/redbooks; (270 Pages).

"System Administration Guide"; Sun Microsystems, Inc.; Feb. 2000 (666 Pages).

An Introduction to GPFS v1.3 for Linux; White Paper; IBM; Jun. 2003 (14 Pages).

Ghemawat, Sanjay; "The Google File System"; Bolton landing, New York, USA; Oct. 19-22, 2003 (15 Pages).

* cited by examiner

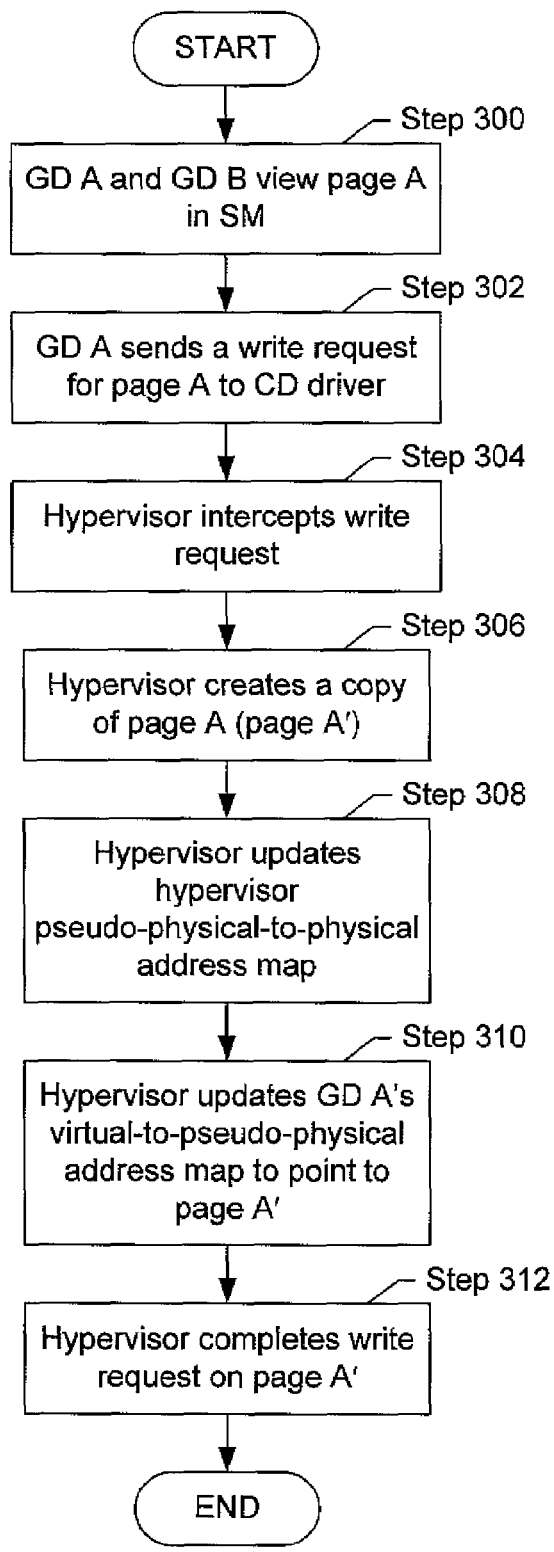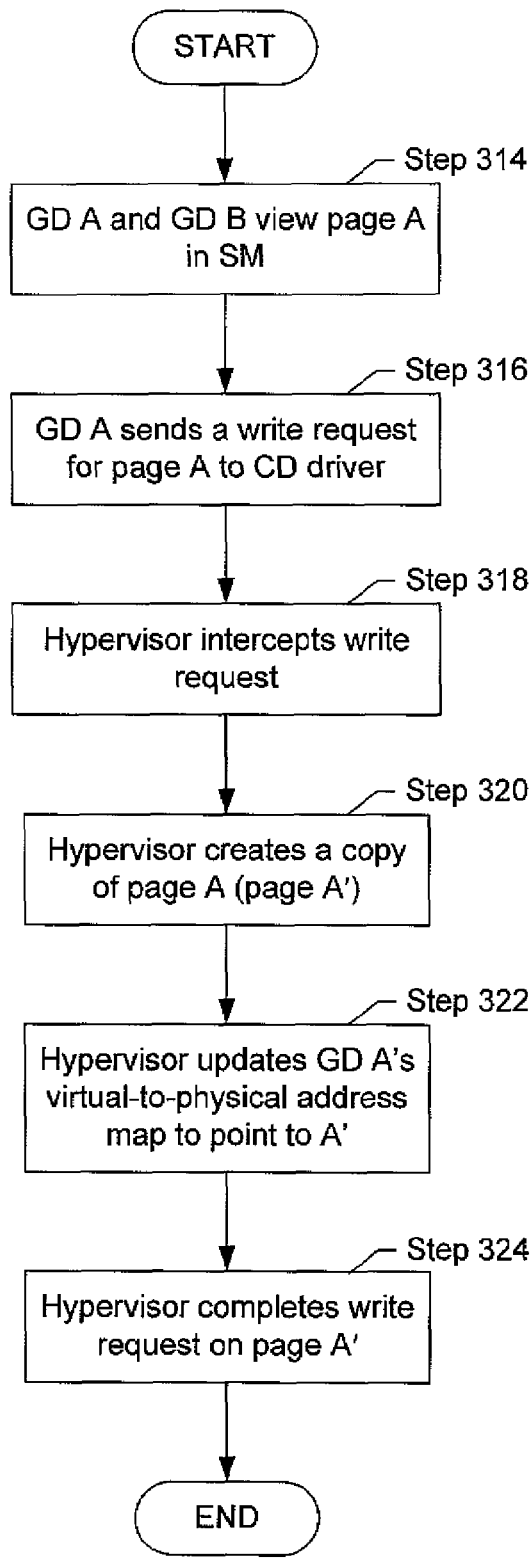
FIGURE 3A
FIGURE 3B

METHOD AND SYSTEM FOR CROSS-DOMAIN DATA SHARING

BACKGROUND

Virtualization technology such as Xen® and VMware® allow multiple operating systems to execute on a single host computer (Xen® is a trademark overseen by the Xen Project Advisory Board and VMware® is a registered trademark of VMware, Inc.). More specifically, two or more operating systems may execute concurrently on the host computer. The virtualization technology provides the necessary functionality to allow each of the operating systems to access (directly or indirectly) the various resources of the host computer (e.g., the processor, main memory, storage pool, network interface, etc.).

For example, a first operating system executing on the host computer may request file A from the storage pool. The request from the first operating system is received by the appropriate interface provided by the virtualization technology. The virtualization technology then performs the appropriate action to obtain file A from the storage pool and load a copy of file A into the portion of main memory allocated to the first operating system. If a second operating system subsequently requests file A, the virtualization technology subsequently obtains and stores a copy of file A into the portion of main memory allocated to the second operating system.

In such cases, two copies of the same file (i.e., file A) are present in main memory. This may result in inefficient usage of the main memory. In some cases, the virtualization technology may include functionality to remove the duplicate copies of files from the main memory (i.e., after two or more copies of a given file have been loaded into main memory). Specifically, once the two copies of file A are loaded into main memory, a determination may be made about whether the two files are the same (e.g., by calculating a checksum of the memory pages containing each copy of file A and then comparing the checksums). If two memory pages are found to be the same, the virtualization technology performs the appropriate actions to ensure that both operating systems are still able to access the remaining copy of file A in the main memory and one of the copies is removed.

SUMMARY

In general, the invention relates to a method for sharing data between a first domain and a second domain. The method includes issuing a first request for data from a storage pool by the first domain, wherein the first request comprises a first pseudo-physical page number, wherein the first domain comprises a first domain address map, and wherein the first domain address map comprises an entry associating the first pseudo-physical page number with a first virtual memory address, receiving the first request by a control domain driver in a control domain, obtaining the data from the storage pool by the control domain driver, storing a first copy of the data in shared memory at a first physical address, wherein the shared memory is accessible by the control domain, the first domain, and the second domain, updating a hypervisor page map to include an entry associating the first pseudo-physical page number with the first physical address, notifying the first domain that the first request has been completed, issuing a second request for the data from the storage pool by the second domain, wherein the second request comprises a second pseudo-physical page number, wherein the second domain comprises a second domain address map, and wherein the second domain address map comprises an entry associating the second pseudo-physical page number with a second virtual memory address, receiving the second request by the control domain driver in the control domain, determining by the control domain driver that the first copy of the data is present in the shared memory, updating the hypervisor page map to include an entry associating the second pseudo-physical page number with the first physical address, and notifying the second domain that the second request has been completed, wherein the first domain and second domain communicate with the control domain using a hypervisor.

In general, the invention relates to a computer readable medium comprising instructions executable by a processor for performing a method. The method includes issuing a first request for data from a storage pool by a first domain, wherein the first request comprises a first pseudo-physical page number, wherein the first domain comprises a first domain address map, and wherein the first domain address map comprises an entry associating the first pseudo-physical page number with a first virtual memory address, receiving the first request by a control domain driver in a control domain, obtaining the data from the storage pool by the control domain driver, storing a first copy of the data in shared memory at a first physical address, wherein the shared memory is accessible by the control domain, the first domain, and a second domain, updating a hypervisor page map to include an entry associating the first pseudo-physical page number with the first physical address, notifying the first domain that the first request has been completed, issuing a second request for the data from the storage pool by the second domain, wherein the second request comprises a second pseudo-physical page number, wherein the second domain comprises a second domain address map, and wherein the second domain address map comprises an entry associating the second pseudo-physical page number with a second virtual memory address, receiving the second request by the control domain driver in the control domain, determining by the control domain driver that the first copy of the data is present in the shared memory, updating the hypervisor page map to include an entry associating the second pseudo-physical page number with the first physical address, and notifying the second domain that the second request has been completed, wherein the first domain and second domain communicate with the control domain using a hypervisor.

In general, in one aspect, the invention relates to a system, comprising a processor, main memory comprising shared memory, a storage pool, wherein the storage pool comprises instructions executable by the processor to perform a method The method comprising issuing a first request for data from a storage pool by a first domain, wherein the first request comprises a first pseudo-physical page number, wherein the first domain comprises a first domain address map, and wherein the first domain address map comprises an entry associating the first pseudo-physical page number with a first virtual memory address, receiving the first request by a control domain driver in a control domain, obtaining the data from the storage pool by the control domain driver, storing a first copy of the data in the shared memory at a first physical address, wherein the shared memory accessible by the control domain, the first domain, and a second domain, updating a hypervisor page map to include an entry associating the first pseudo-physical page number with the first physical address, notifying the first domain that the first request has been completed, issuing a second request for the data from the storage pool by the second domain, wherein the second request comprises a second pseudo-physical page number, wherein the second domain comprises a second domain address map, and wherein the second domain address map comprises an entry associating the second pseudo-physical page number with a second virtual memory address, receiving the second request by the control domain driver in the control domain, determining by the control domain driver that the first copy of the data is present in the shared memory, updating the hypervisor page map to include an entry associating the second pseudo-physical page number with the first physical address, and notifying the second domain that the second request has been completed, wherein the first domain and second domain communicate with the control domain using a hypervisor.

Other aspects of the invention will be apparent from the following description and the appended claims.

BRIEF DESCRIPTION OF DRAWINGS

FIGS. 2, 3A, and 3B show flowchart in accordance with one or more embodiments of the invention.

DETAILED DESCRIPTION

Figure 1A:
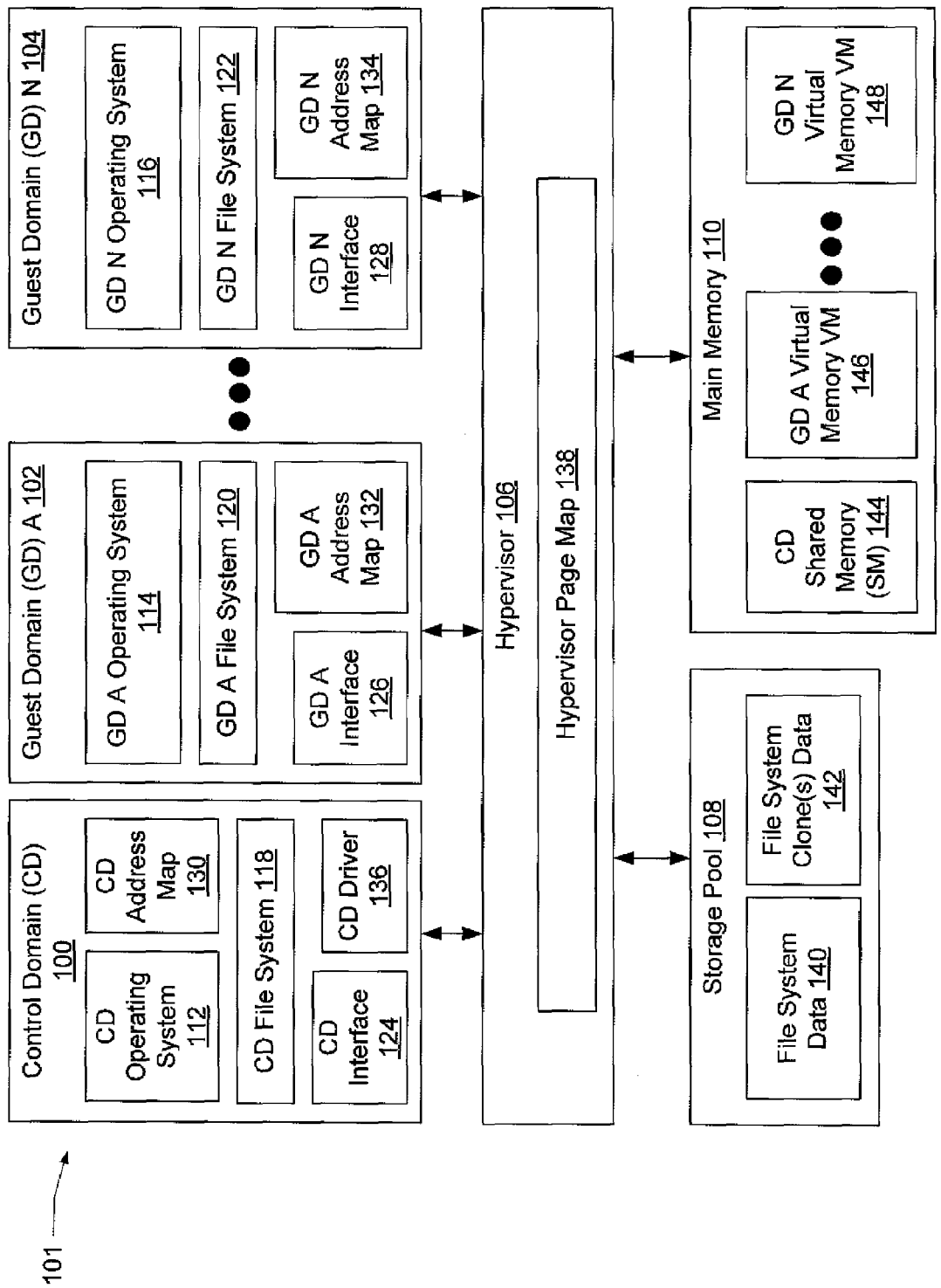
FIG. 1A shows a host computer in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for sharing data between domains on a host computer. More specifically, embodiments of the invention provide a method and system for increasing the efficiency of main memory utilization by not storing duplicate copies of a file (or a portion thereof) in main memory.

In particular, embodiments of the invention provide functionality to determine whether a file (or portion thereof) is already present in the main memory of the host computer prior to attempting to load a copy of the file (or portion thereof) into the main memory. If a copy of the file is already present in main memory, then no additional copies of the file are obtained or loaded into main memory. Using embodiments of the invention, a host system may decrease the number of I/O requests and processing time required to create and load copies of files into main memory.

FIG. 1A shows a host in accordance with one or more embodiments of the invention. The host computer (101) includes a control domain (100) and one or more guest domains (102, 104). The control domain (100) and each of the guest domains (102, 104) are individual isolated execution environments. In one or more embodiments of the invention, each of the guest domains (102, 104) corresponds to a virtual machine executing on the operating system provided by the control domain (100) (e.g., CD operating system 112).

In one or more embodiments of the invention, the control domain (100) communicates with each of the guest domains (102, 104) using a hypervisor (106). Further, the hypervisor (106) provides an abstraction layer between the domains (100, 102, 104) and the underlying host computer (101) resources (e.g., storage pool (108), main memory (110), processor(s), network interface(s), etc.). The abstraction layer allows the hypervisor to control and/or limit access of each the domains (100, 102, 104) to the underlying host computer (101) resources. The access to the underlying host computer (101) resources enforced by the hypervisor (106) may vary per domain. For example, the control domain (100) may be provided with greater access as compared with the guest domains (102, 104). In one or more embodiments of the invention, the hypervisor (106) executes on the CD operating system (112).

In one or more embodiments of the invention, the hypervisor (106) includes and/or maintains a hypervisor page map (138). The hypervisor page map (138) may be located at any location in the host computer (101), which is accessible to the hypervisor (106). In one or more embodiments of the invention, the hypervisor page map (138) maintains a mapping between pseudo-physical pages and physical addresses. In one or more embodiments of the invention, the hypervisor (106) may include and/or maintain a data structure which tracks a reference count for each file (or portion thereof) stored in the shared memory (144). In one or more embodiments of the invention, the reference count may be used by other mechanisms in the guest domains and/or control domain which handle removing pages from main memory. For example, if the reference count for a given piece of data is greater than 0, the page on which the data is located cannot be overwritten with new data. The aforementioned data structure may be located at any location in the host computer (101), which is accessible to the hypervisor (106). In one or more embodiments of the invention, the hypervisor is Xen®. Those skilled in the art will appreciate that other hypervisors may be used to implement one or more embodiments of the invention.

In one or more embodiments of the invention, each guest domain (102, 104) may include, but is not limited to, an operating system (114, 116), a file system (120, 122), an interface (126, 128), and an address map (132, 134). In one or more embodiments of the invention, each guest domain (102, 104) may include a different operating system. In one or more embodiments of the invention, the file system (120, 122) provides file manipulation interfaces to open, close, read, and write the data within each file, where the files are stored in the storage pool (108). In one or more embodiments of the invention, each file system (120, 122) implements ZFS (ZFS is a file system developed by Sun Microsystems, Inc.). In one or more embodiments of the invention, the address map (132, 134) maintains a mapping between virtual addresses and pseudo-physical pages. In another embodiment of the invention, the address map (132, 134) maintains a mapping between virtual addresses and physical pages.

In one or more embodiments of the invention, each of the guest domains (102, 104) may be implemented in hosted mode or in paravirtualized mode. In one or more embodiments of the invention, a guest domain (102, 104) implemented in hosted mode is not aware that it is executing on a virtualized environment. In such cases, two levels of indirection are required for I/O operations. Specifically, the guest domain (102, 104) uses virtual addresses to access memory (where the virtual addresses are specific to that guest domain), the hypervisor (106) uses pseudo-physical pages which map to virtual memory pages, and the hypervisor (106) includes functionality to map pseudo-physical pages to underlying physical pages in main memory (110). In one or more embodiments of the invention, the pseudo-physical pages is a memory abstraction mechanism used by the hypervisor (106). More specifically, in one or more embodiments of the invention, the pseudo-physical pages appear as physical memory to the guest domains (102, 104) and as virtual memory to the hypervisor (106). In one or more embodiments of the invention, a guest domain (102, 104) implemented in paravirtualized mode is aware that it is executing on a virtualized environment. In such cases, one level of indirection is required for I/O operations. Specifically, the guest domain (102, 104) uses virtual addresses to access main memory (where the virtual addresses are specific to that guest domain), the hypervisor (106) uses physical pages which map to virtual memory pages, and the hypervisor (106) includes functionality to map virtual addresses to underlying physical pages in main memory (110).

In one or more embodiments of the invention, the interfaces (126, 128) provide a mechanism to allow the guest domain (126, 128) to interact the underlying host computer (101) resources via the control domain (100). More specifically, in one or more embodiments of the invention, the interfaces (126, 128) appear as device drivers to other components (e.g., 114, 116, 120, 122) in the guest domain (102, 104). Accordingly, requests received by the interfaces (126, 128) are provided to the control domain for servicing. Further, the results of the servicing the request are communicated back to the appropriate guest domain (102, 104) via the interface (126, 128).

In one or more embodiments of the invention, the control domain (100) may include, but is not limited to, a control domain operating system (112), an address map (130), a file system (118), one or more interface(s) (124), and one or more drivers (136). Each of these components is discussed below.

In one or more embodiments of the invention, the control domain operating system (112) is the first operating system loaded and executed when the host computer (101) initially boots. In one or more embodiments of the invention, the control domain operating system (112) may also execute the hypervisor (106). In one or more embodiments of the invention, the address map (130) maintains a mapping between virtual addresses and pseudo-physical pages. In another embodiment of the invention, the address map (130) maintains a mapping between virtual addresses and physical pages.

In one or more embodiments of the invention, each CD interface (124) is configured to interact with corresponding interfaces (126, 128) in the guest domains (102, 104). In particular, the CD interface (124) is configured to receive requests from one or more interfaces (126, 128) and forward such requests to the appropriate driver (136). For example, if the interface (126) in the guest domain (102) is for a block device (e.g., the interface (126) appears as a block device driver to components in the guest domain), then a request from the guest domain (102) received by the interface (102) is communicated, via the hypervisor (106) (or using a mechanism provided by the hypervisor (106)), to the appropriate interface in the control domain (e.g., CD interface (124)). The CD interface (124) then forwards the request to the appropriate block device driver in the control domain (e.g., CD driver (136)). In one or more embodiments of the invention, the control domain (100) includes one or more device drivers (e.g., CD driver (136)), which include functionality to interact directly with the underlying host computer (101) resources.

In one or more embodiments of the invention, the CD file system (118) provides file manipulation interfaces to open, close, read, and write the data within each file, where the files are stored in the storage pool (108). In one or more embodiments of the invention, the CD file system (118) implements ZFS (ZFS is a file system developed by Sun Microsystems, Inc.).

In one or more embodiments of the invention, the main memory (110) correspond to non-persistent storage and/or volatile storage such as flash memory, random access memory, EEPROM, etc. In one or more embodiments of the invention, the main memory (110) includes shared memory (144) as well as virtual memory allocated for each of the guest domains (146, 148). The shared memory (144) is accessible by all domains (100, 102, 104) in the host computer (101). The aforementioned virtual memory (146, 148) corresponds to virtual memory allocated exclusively for use by a particular guest domain (102, 104). In addition, though not shown, the control domain (100) may also include virtual memory allocated exclusively for its use.

In one or more embodiments of the invention, the storage pool (108) includes one or more physical disks. Further, in one or more embodiments of the invention, the storage capacity of the storage pool (108) may increase and decrease dynamically as physical disks are added and removed from the storage pool. In one or more embodiments of the invention, the storage space available in the storage pool (108) is managed by the CD file system (118).

In one or more embodiments of the invention, the storage space in the storage pool (108) is divided into contiguous regions of data, ie., metaslabs. The metaslabs may in turn be divided into segments (i.e., portions of the metaslab). The segments may all be the same size, or alternatively, may be a range of sizes. A metaslab allocator (not shown) includes functionality to allocate large or small segments to store data blocks and indirect blocks. In one or more embodiments of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab.

Figure 1B:
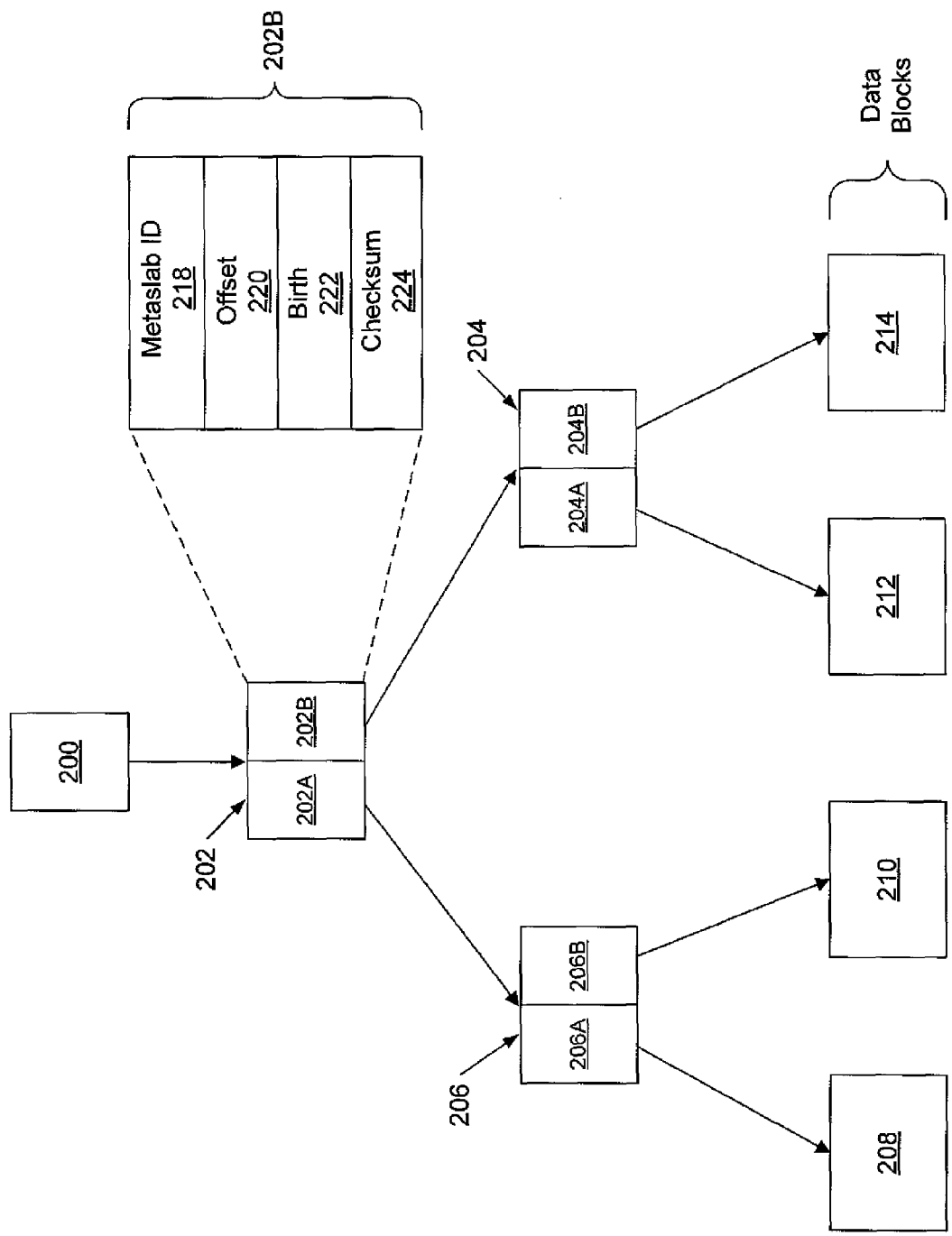
FIG. 1B shows a hierarchical block tree in accordance with one or more embodiments of the invention.

As noted above, the storage pool (108) is divided into metaslabs, which are further divided into segments. Each of the segments within the metaslab may then be used to store a data block (i.e., data) or an indirect block (i.e., metadata). FIG. 1B shows the hierarchical block tree (hereinafter referred to as a "HBT") for storing data blocks and indirect blocks within the storage pool in accordance with one or more embodiments of the invention. In one or more embodiments of the invention, the HBT includes a root block (200), one or more levels of indirect blocks (202, 204, 206), and one or more data blocks (208, 210, 212, 214). In one or more embodiments of the invention, the location of the root block (200) is in a particular location within the storage pool. The root block (200) typically points to subsequent indirect blocks (202, 204, and 206). In one or more embodiments of the invention, indirect blocks (202, 204, and 206) may be arrays of block pointers (e.g., 202A, 202B, etc.) that, directly or indirectly, reference to data blocks (208, 210, 212, and 214). The data blocks (208, 210, 212, and 214) include actual data of files stored in the storage pool. One skilled in the art will appreciate that several layers of indirect blocks may exist between the root block (200) and the data blocks (208, 210, 212, 214).

In contrast to the root block (200), indirect blocks and data blocks may be located anywhere in the storage pool (108 in FIG. 1A). In one or more embodiments of the invention, the root block (200) and each block pointer (e.g., 202A, 202B, etc.) includes data as shown in the expanded block pointer (202B). One skilled in the art will appreciate that data blocks do not include this information; rather data blocks include actual data of files within the file system.

In one or more embodiments of the invention, each block pointer includes a metaslab ID (218), an offset (220) within the metaslab, a birth value (222) of the block referenced by the block pointer, and a checksum (224) of the data stored in the block (data block or indirect block) referenced by the block pointer. In one or more embodiments of the invention, the metaslab ID (218) and offset (220) are used to determine the location of the block (data block or indirect block) in the storage pool.

The metaslab ID (218) identifies a particular metaslab. More specifically, the metaslab ID (218) may identify the particular disk (within the storage pool) upon which the metaslab resides and where in the disk the metaslab begins. The offset (220) may then be used to reference a particular segment in the metaslab. In one or more embodiments of the invention, the data within the segment referenced by the particular metaslab ID (218) and offset (220) may correspond to either a data block or an indirect block. If the data corresponds to an indirect block, then the metaslab ID and offset within a block pointer in the indirect block are extracted and used to locate a subsequent data block or indirect block. The HBT may be traversed in this manner to eventually retrieve a requested data block.

In one or more embodiments of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed or until they are no longer referenced by an indirect block).

Referring to FIG. 1A, the storage pool (108) includes file system data (140) and file system clone(s) data (142). In one or more embodiments of the invention, the CD file system (118) is configured to access the file system data (140) and each of the file systems in the guest domains (e.g., 120, 122) is configured to access data from different file system clone data (142). In one or more embodiments of the invention, the file system data (140) corresponds to a HBT and the file system clone data (142) for each of the file systems in the guest domains (e.g., 120, 122) is a clone of the HBT (hereafter "clone").

In one or more embodiments of the invention, the HBT corresponds to a group of blocks referenced, directly or indirectly, by a root block. As discussed above, as the blocks referenced by the root block are modified, the modified blocks are written to unused locations in the storage pool and the root block is modified to include references to the modified blocks. A snapshot corresponds to a state of the HBT at a given time, where the state of the HBT corresponds to all blocks referenced, directly or indirectly, by the root block of the HBT at the aforementioned time.

In one or more embodiments of the invention, a clone corresponds to an HBT where the initial state of the clone is obtained from a snapshot of the HBT. Said another way, the clone corresponds to a pre-populated HBT where the clone initially includes only blocks referenced, directly or indirectly, by the root block of the HBT at the time the snapshot was created. In one or more embodiments of the invention, file system may also create snapshot(s) of the clones.

Figure 1C:
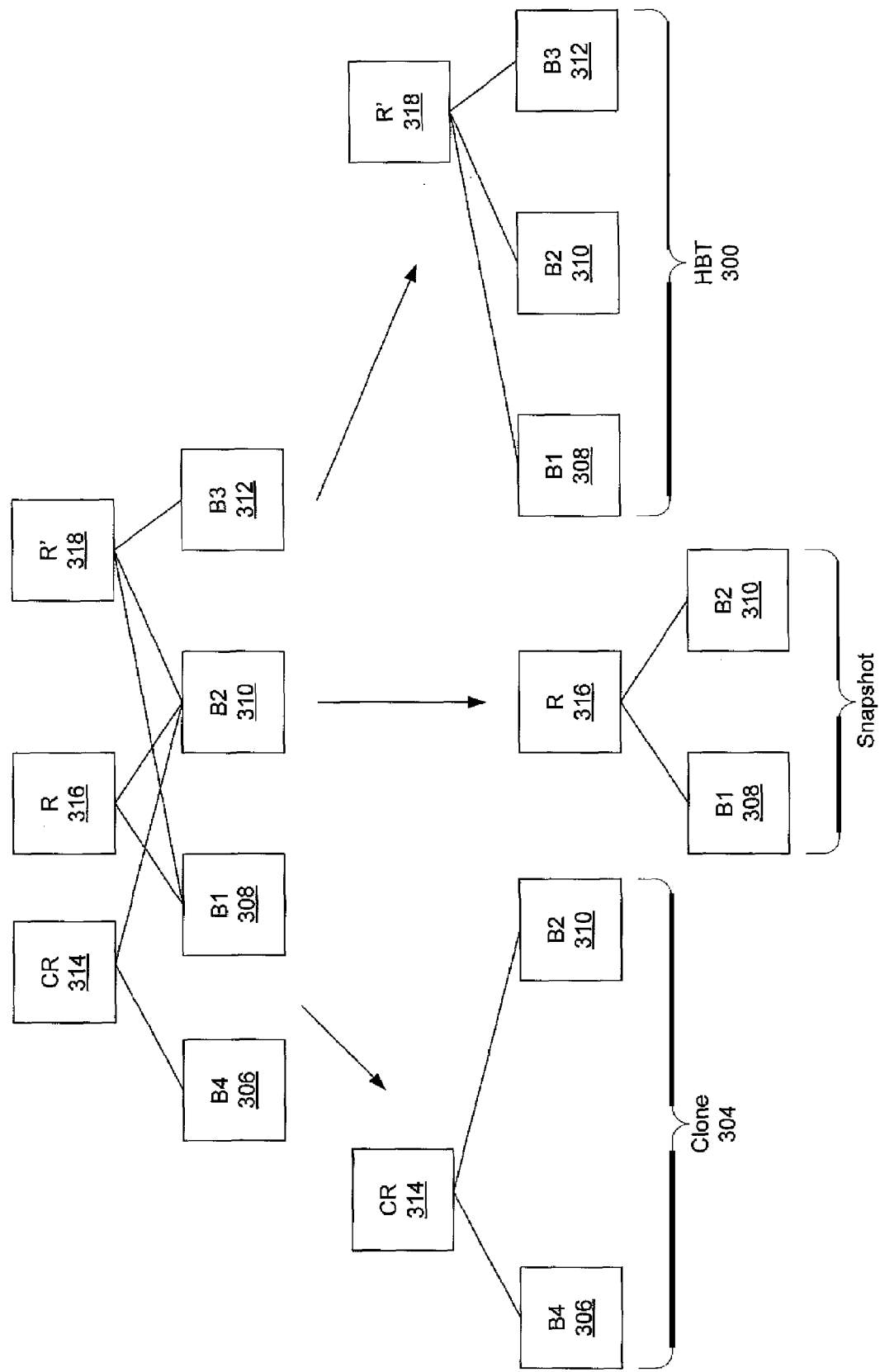
FIG. 1C shows a hierarchical block tree, a snapshot, and a clone in accordance with one or more embodiments of the invention.

In one or more embodiments of the invention, the HBT and the clone(s) may each be modified independently. For example, modifying the contents of the HBT will not affect the clone and vise versa. Further, the file system is configured to manage HBTs, snapshots and clones concurrently. For example, FIG. 1C shows a hierarchical block tree, a snapshot, and a clone in accordance with an embodiment of the invention. As shown in FIG. 1C, each block (e.g., B1 (308), B2 (310), B3 (312), B4 (306)) may be referenced by, and therefore be a part of, the HBT (300), the snapshot (302), and the clone (304).

Specifically, the HBT (300) includes a second version of the root block R' (318). The second version of the root block R' (318) in turn references blocks B1 (308), B2 (310), and B3 (312). Further, the snapshot (302) includes a first version of the root block R (316). The first version of the root block R (316) in turn references blocks B1 (308) and B2 (310). Finally, the clone (304) includes a copy of the first version of the root block CR (i.e., the clone root block) (314). The clone root block CR (314) in turn references blocks B2 (308) and B4 (306).

As discussed above, the snapshot of the HBT correspond to the state of the HBT at a given time. Accordingly, in FIG. 1C, the snapshot (302) corresponds to the state of the HBT (300) prior to the addition of block B3 (312) to the HBT (300). Similarly, as discussed above, the initial state of the clone corresponds to the snapshot. Accordingly, in FIG. 1C, the initial state of the clone (304) (i.e., the blocks initially referenced by the clone root block CR (314)) are blocks B1 (306) and B2 (308).

Finally, as discussed above, the clone and the HBT may be modified independently of one another. As shown in FIG. 1C, the clone (304) is modified to remove the reference to block B1 (308) and to add a reference to block B4 (306). The removal of the reference to block B1 (308) from the clone (304) did not affect the reference to block B1 (308) by the HBT (300).

U.S. patent application Ser. No. 11/513,800 entitled "Unlimited File System Snapshots and Clones" describes one or more embodiments of HBTs, clones, and snapshots and is hereby incorporated by reference in its entirety.

In one or more embodiments of the invention, the CD file system (118) accesses files in the storage pool using the root of the HBT. Further, each of the file systems in the guest domains (120, 122) use their own cloned root of the HBT to access files in the storage pool (108). Those skilled in the art will appreciate that while each of the file systems (118, 120, 122) uses a different root to access files in the storage, the underlying indirect blocks and data blocks in storage pool (108) may be the same. Said another way, each of the file systems (118, 120, 122) may access the same files using different root blocks and indirect blocks.

Figure 2:
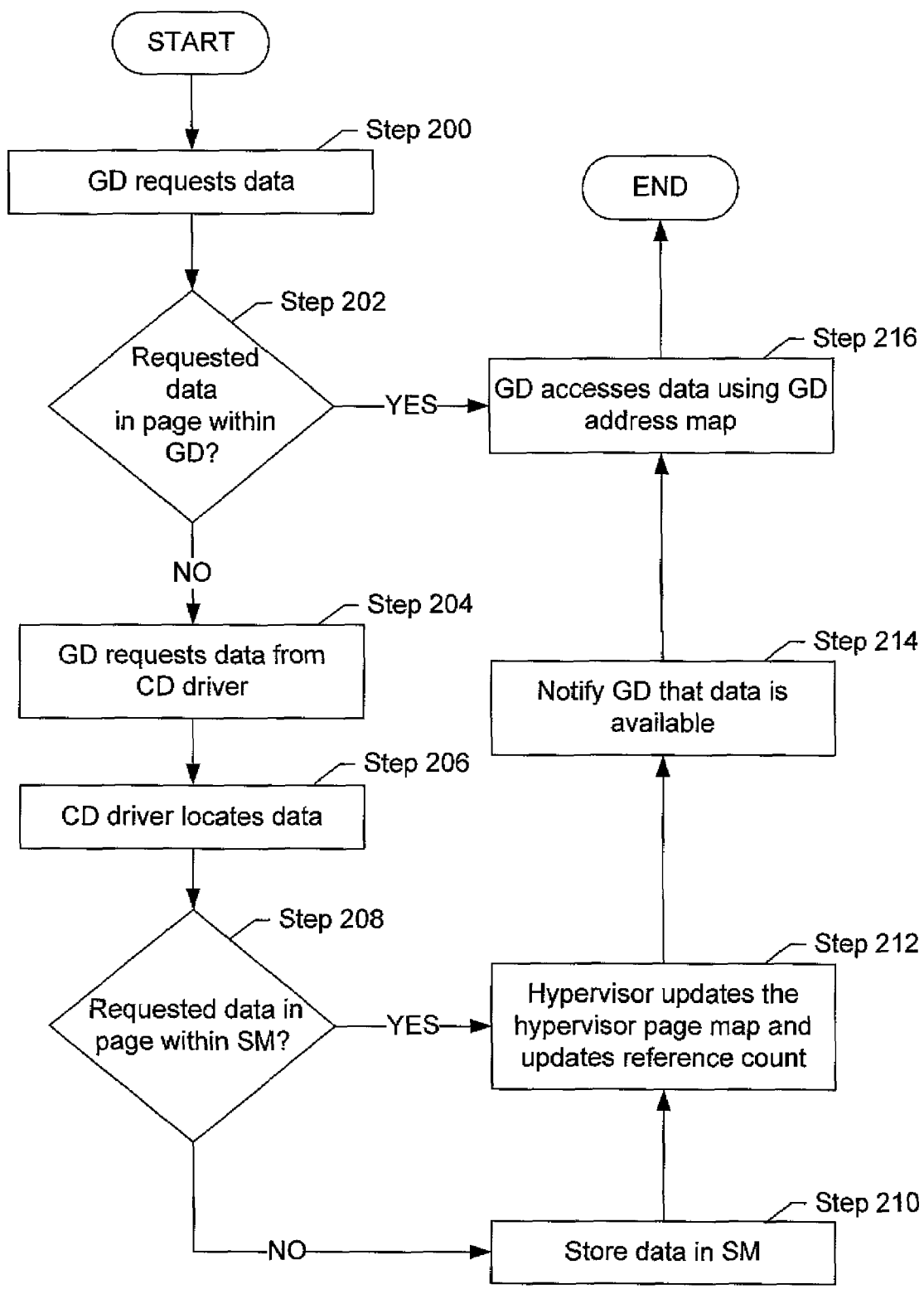

FIGS. 2, 3A, and 3B show flowchart in accordance with one or more embodiments of the invention. In one or more embodiments of the invention, one or more of the steps shown in FIGS. 2, 3A, and 3B may be omitted, repeated, and/or performed in a different order. Accordingly, embodiments of the invention should not be considered limited to the specific arrangement of steps shown in FIGS. 2, 3A, and 3B.

FIG. 2 shows a flowchart for servicing a request for data in accordance with one or more embodiments of the invention. In Step 200, the guest domain requests data (e.g., a file (or portion thereof)). In Step 202, determination is the then made about whether the requested data has been previously requested and obtained by the guest domain. In one or more embodiments of the invention, the process of determining whether the data has been previously retrieved by the guest domain is performed using well known mechanisms. If the requested data has been previously requested, the process proceeds to Step 216. Otherwise, the process proceeds to Step 204.

In Step 204, the guest domain (via the GD interface) sends a request for data to the control domain driver (via the hypervisor and CD interface). In one or more embodiments of the invention, the request includes a reference to a particular physical page. In one or more embodiments of the invention, the hypervisor maps the virtual memory address to a pseudo-physical page and then provides the pseudo-physical page to the guest domain. The pseudo-physical page may be provided to the guest domain at the time the guest domain initially obtains its virtual memory address range (i.e., prior to Step 200) or at another time.

In Step 206, the CD driver locates the data. In one or more embodiments of the invention, the CD driver, in conjunction with the GD file system, traverses a clone associated with the guest domain which made the request for data. As discussed above, the traversal is initiated using a root of the clone. In one or more embodiments of the CD driver and the GD file system traverse the clone using the method described in U.S. patent application Ser. No. 10/828,537 entitled "Method and Apparatus for Self-Validating Checksums in a File System" which is hereby incorporated by reference in its entirety. In one or more embodiments of the invention, the CD driver may search both the shared memory (within the main memory) and the storage pool to locate the requested data. In one or more embodiments of the invention, the CD driver uses a metaslab ID and Offset to locate the data.

In Step 208, if the requested data is in the shared memory, then the process proceeds to Step 212. Otherwise, the process proceeds to Step 210. In one or more embodiments of the invention, the determination in Step 208 is made by comparing the metaslab ID and offset (or equivalent information) of the requested data to the metaslab ID and offset associated with the data currently located in the shared memory (Note: the metaslab ID and offset for the data in shared memory corresponds to the metaslab ID and offset of the original data in the storage pool of which the data is shared memory is a copy). If the aforementioned information is the same, then the requested data corresponds to the data in the shared memory. Those skilled in the art will appreciate that if the requested data (e.g., File A) has been modified by another domain, then the storage pool would include the original copy of File A as well as a modified copy of File A. In such cases, the File A and modified File A would be stored at different metaslab IDs and offsets. Further, typically both the original File A and modified File A would not be accessible to a given domain.

In Step 210, the requested data located in the storage pool is stored in the shared memory. In one or more embodiments of the invention, a copy of the requested data is stored in the shared memory. In one or more embodiments of the invention, the metaslab ID and offset information (or equivalent information) for the requested data is also stored by the hypervisor.

In Step 212, the hypervisor updates the hypervisor page map to indicate that the pseudo-physical page is mapped to a physical address. The physical address corresponds to the physical location in the main memory at which the requested data is located. In addition, a reference count associated with the requested data is incremented to indicate that the requested data is referenced by a guest domain. Those skilled in the art will appreciate when other guest domains request the same data, the reference count will be increased accordingly. Further, when references to the requested data are removed (e.g., when entries in the address map and/or hypervisor page map are removed or modified), the reference count may be decremented accordingly.

In Step 214, the guest domain (via the CD interface, hypervisor, and GD interface) is notified that the data was successfully obtained and stored at the virtual memory address specified in Step 204. Those skilled in the art will appreciate that from the perspective of the guest domain, the requested data is stored in the exclusive virtual memory of the guest domain. However, the requested data is actually stored in the shared memory and is accessible to the guest domain via the hypervisor page map and the guest domain address map. In Step 216, the guest domain may access the requested data using the hypervisor page map and the guest domain address map.

In one or more embodiments of the invention, once data is loaded into the shared memory, a guest domain referencing the data may attempt to modify the data. FIG. 3A shows a method for handling a write request for data when the guest domain is implemented in host mode. FIG. 3B shows a method for handling a write request for data when the guest domain is implemented in paravirtualized mode.

Referring to FIG. 3A, in Step 300, both guest domain A (GD A) and guest domain B (GD B) currently include entries in the appropriate address maps to view page A in the shared memory. In Step 302, GD A sends a write request to the CD driver. In Step 304, the hypervisor intercepts the write request. In Step 306, the hypervisor creates a copy of page A (i.e., page A') and stores page A' at a physical address in the portion of the main memory allocated to GD A (i.e., the virtual memory of the GD).

In Step 308, the hypervisor updates the hypervisor address map to reflect a new pseudo-physical page to physical address mapping using the physical address in Step 306 and a new pseudo-physical page. In Step 310, the hypervisor updates the GD address map to reflect a mapping between the new pseudo-physical memory page from Step 308 and the virtual address. A new virtual address may be allocated and used in the aforementioned mapping or the previously used virtual address (i.e., the virtual address used to reference page A) may be remapped to the new pseudo-physical page. In one or more embodiments of the invention, the reference count for page A is decremented. In Step 312, the hypervisor completes the write request on page A'.

Referring to FIG. 3B, in Step 314, both guest domain A (GD A) and guest domain B (GD B) currently include entries in the appropriate address maps to view page A in the shared memory. In Step 316, GD A sends a write request to the CD driver. In Step 318, the hypervisor intercepts the write request. In Step 320, the hypervisor creates a copy of page A (i.e., page A') and stores page A' at a physical address in the portion of the main memory allocated to GD A (i.e., the virtual memory of the GD). In Step 322, the hypervisor updates the hypervisor address map to reflect a new virtual address to physical address mapping using the physical address in Step 318 and the previously assigned virtual address (i.e., the virtual address used to reference page A). In one or more embodiments of the invention, the reference count for page A is decremented. In Step 324, the hypervisor completes the write request on page A'.

Figure 4A:
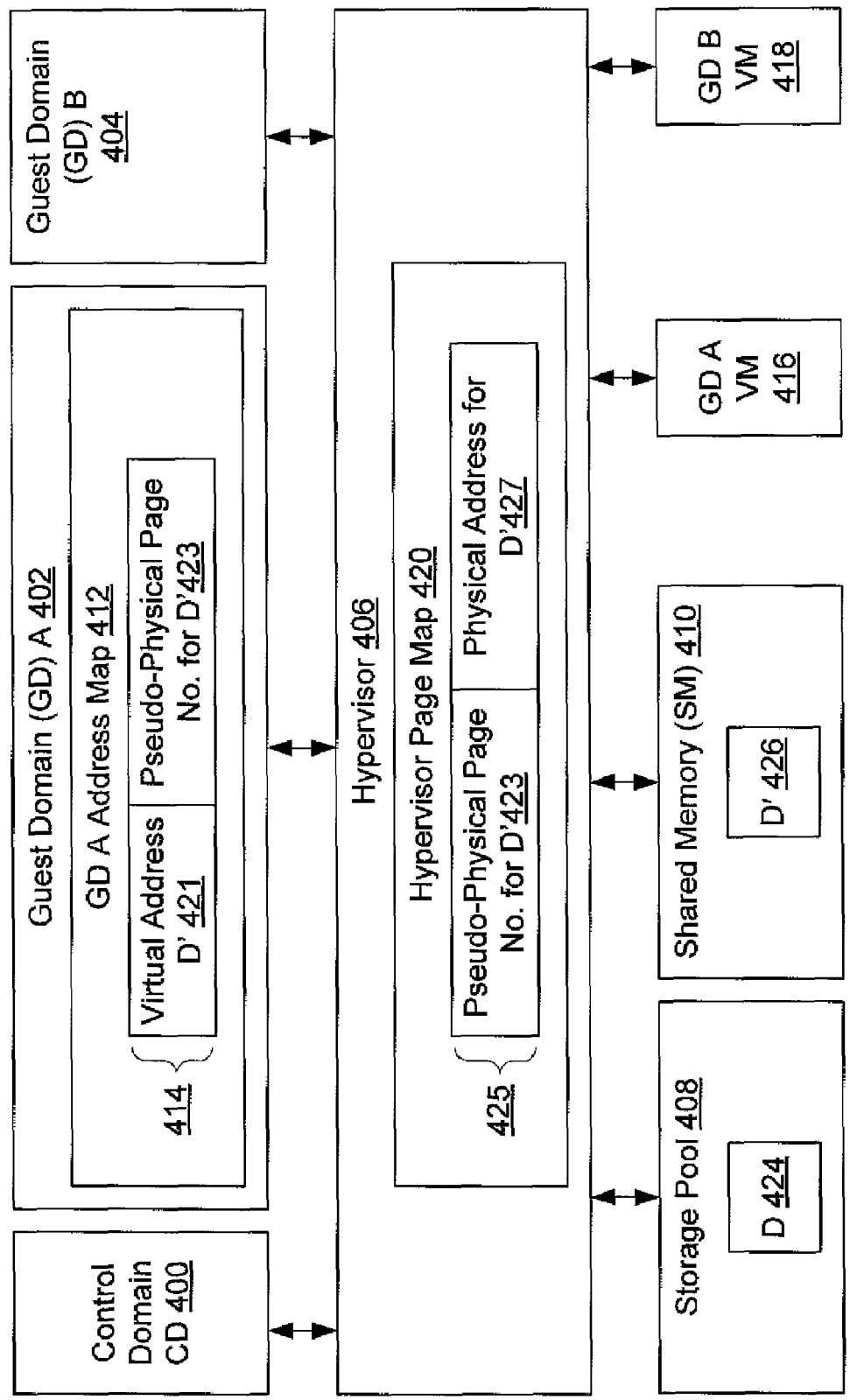
FIGS. 4A-4E show an example in accordance with one or more embodiments of the invention.

FIGS. 4A-4E show an example in accordance with one or more embodiments of the invention. The example is not intended to limit the scope of the invention. Referring to FIG. 4A, the host computer includes a control domain (400), guest domain A (402), and guest domain B (404). The domains (400, 402, 404) all interact with the underlying host computer resources using the hypervisor (106). The host computer is operatively connected to a storage pool (408), which includes data (D) (424). In addition, the host computer is operatively connected to main memory (not shown) which includes shared memory (410), guest domain A virtual memory (416), and guest domain B virtual memory (418).

Figure 4B:
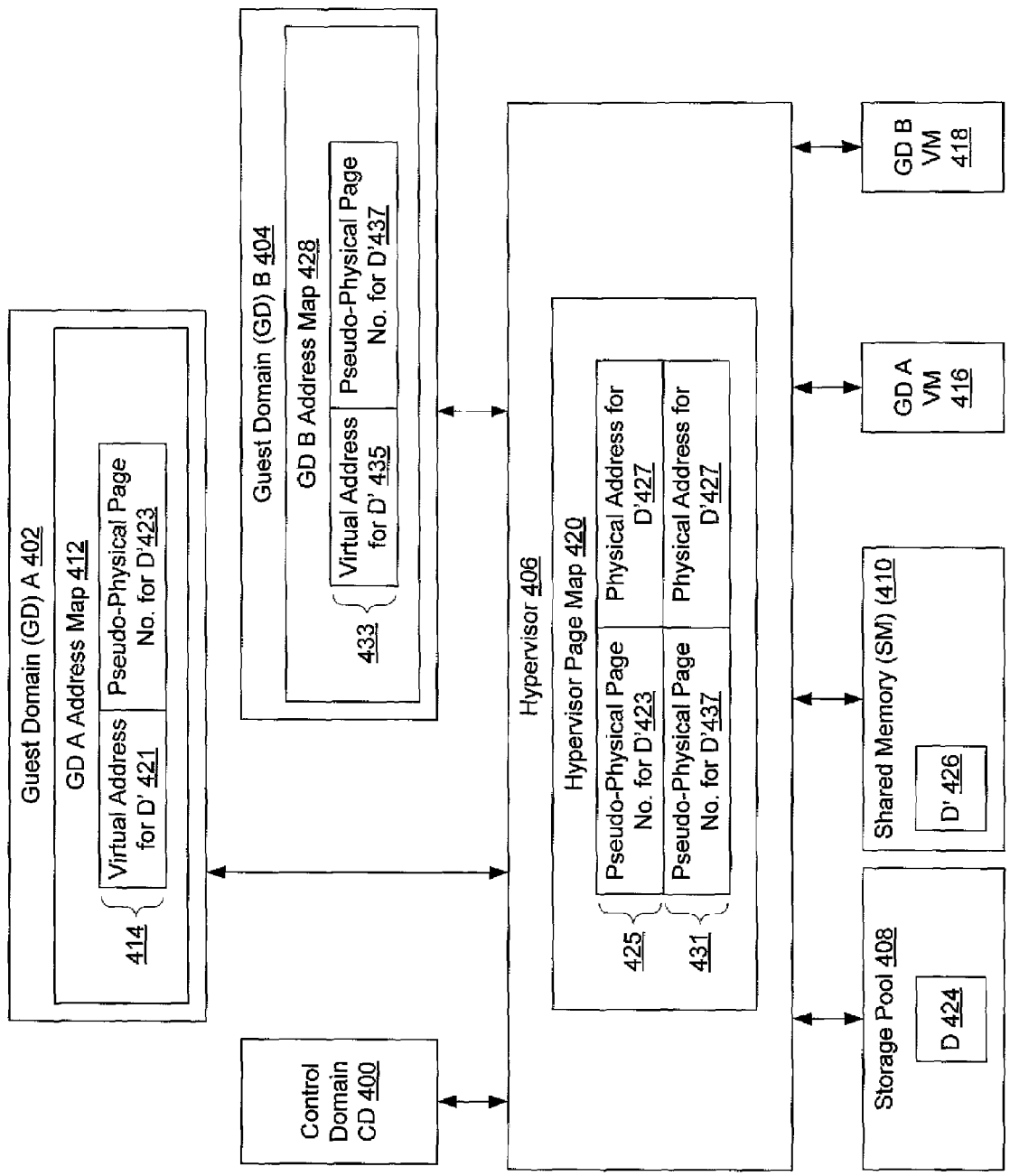
Figure 4C:
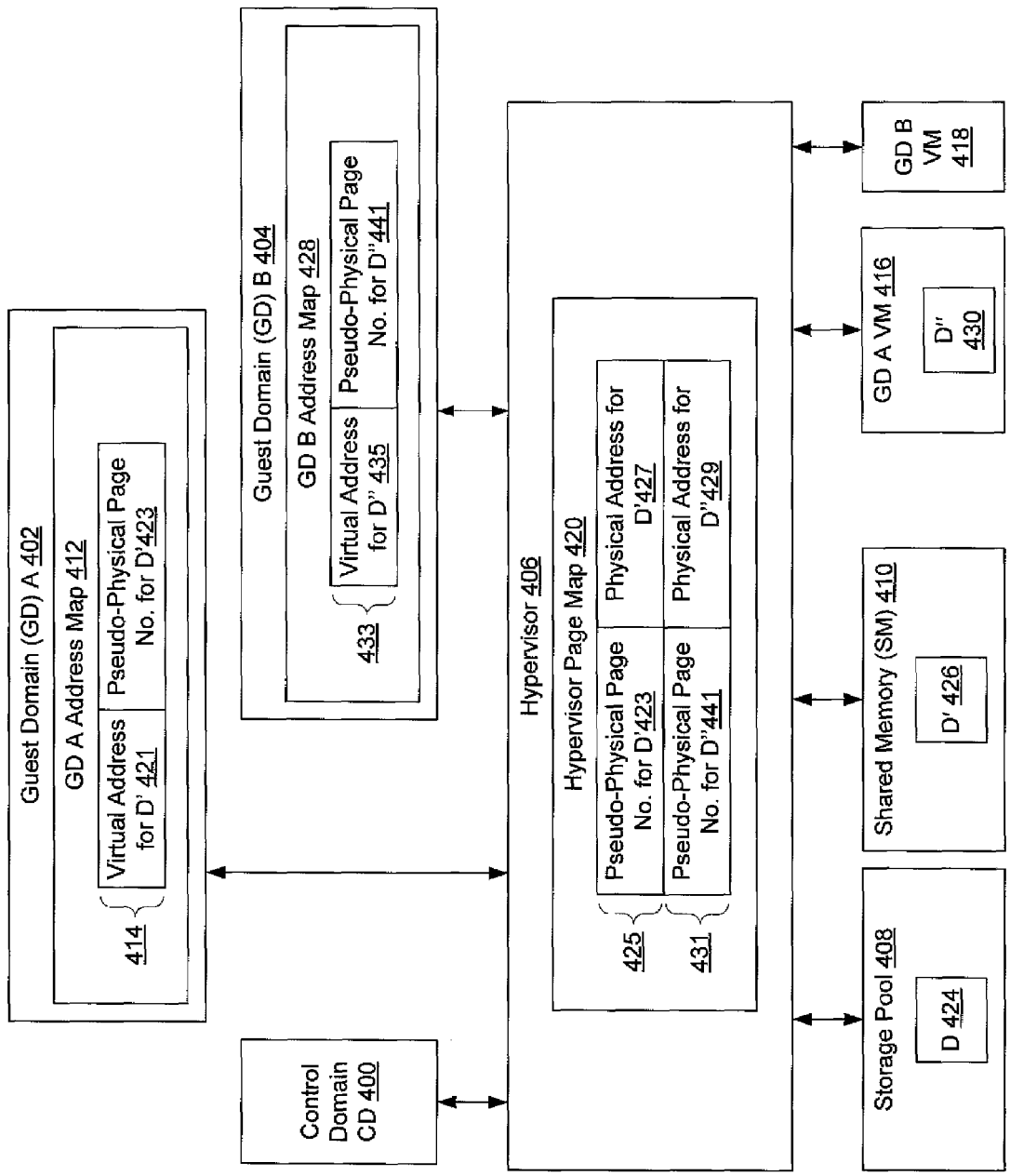
Figure 4D:
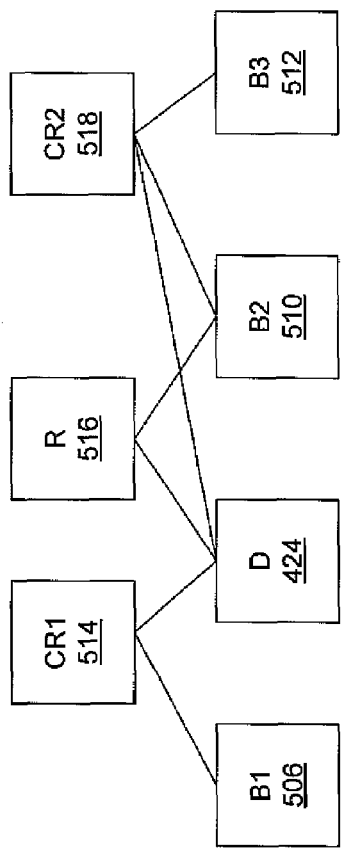

Further, referring to FIG. 4D, the control domain (400) includes a file system (not shown) which references a root block (R) (516). As discussed above, R (516) is used by the file system to obtain requested data from the storage pool. Guest domain A (402) includes a file system (not shown) which references clone root 1 (CR1) (514). As discussed above, CR1 (514) is used by the file system to obtain requested data from the storage pool. Guest domain B (404) includes a file system (not shown) which references clone root 2 (CR2) (518). As discussed above, CR2 (518) is used by the file system to obtain requested data from the storage pool.

Each of the aforementioned root blocks (R, CR1, CR2) is located at a different metaslab ID and Offset in the storage pool (408). Further, each root block (R, CR1, CR2) references D (424), where D (424) is located at another metaslab ID and Offset within the storage pool (408). In addition, each root block references one or more other data blocks (506, 510, 512). (For clarity, the indirect blocks have been omitted from FIGS. 4D and 4E).

Returning to FIG. 4A, consider the scenario in which guest domain A (402) requests D and D is not present in the shared memory (410). In such cases, guest domain A (402) via the file system (not shown), the appropriate interfaces (not shown) in guest domain A and the control domain (400), and the control domain driver (not shown) locates D (424) in the storage pool (408) using CR1 (514). A copy of D (i.e., D' (426)) is stored in the shared memory (410) and guest domain A (402) is notified accordingly. Once the request is complete, the hypervisor page map (420) includes an entry (425) mapping a pseudo-physical page no. for D' (423) to a physical address for D' (427) (i.e., the physical location of D' in the shared memory (410)). Further, the guest domain A address map (412) includes an entry (414) mapping virtual address for D' (421) to the pseudo-physical page no. for D' (423). After guest domain A (402) obtains access to D' (426), the reference count for D' (426) is set at one.

Referring to FIG. 4B, once guest domain A (402) has requested D (424), guest domain B (404) requests D (424). In such cases, guest domain B (404) via the file system (not shown), the appropriate interfaces (not shown) in guest domain B and the control domain (400), and the control domain driver (now shown) locates a copy of D (i.e., D' (426)) in the shared memory (410) using CR2 (518). The hypervisor page map (420) is updated to include an entry (431) mapping a pseudo-physical page no. for D' (437) to a physical address for D' (427). Further, the guest domain B address map (428) includes an entry (433) mapping virtual address for D' (435) to the pseudo-physical page no. for D' (437). After guest domain B (404) obtains access to D' (426), the reference count for D' (426) is set at two.

Referring to FIG. 4C, after guest domain B (404) obtains access to D' (426), guest domain B (404) attempts to modify D' (426) by issuing a write operation. In such cases, the hypervisor (406) intercepts the request, creates a copy of D' (426) and stores the copy (i.e., D" (430)) in guest domain A virtual memory (416). The hypervisor then updates entry (431) to reflect a new mapping between pseudo-physical page no. for D" (441) and a physical address for D" (429). Further, entry (433) in the guest domain B address map is updated to reflect a mapping between virtual address for D" (435) and the pseudo-physical page no. for D" (441). After guest domain B (404) relinquishes access to D' (426), the reference count for D' (426) is set at one and the reference count for D" (430) is set to one.

Figure 4E:
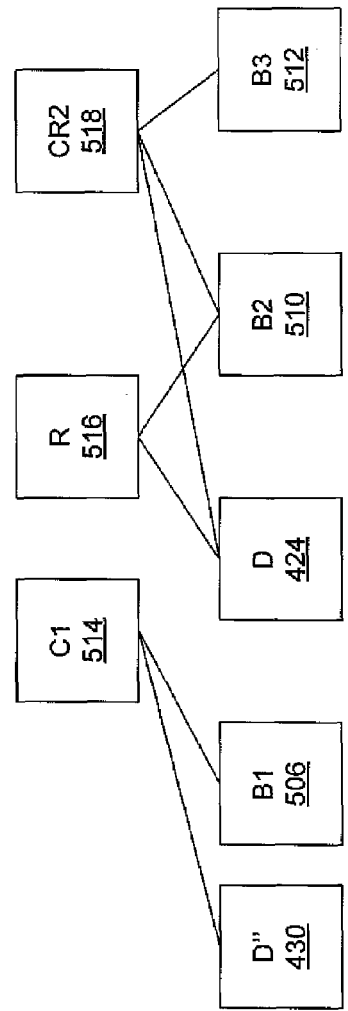

At some later point in time, D" (430) may be stored in the storage pool (408). FIG. 4E shows the status of the root blocks and data blocks in the storage pool (408) after D" (430) is stored in the storage pool. Referring to FIG. 4E, as discussed above, the file systems may implement a copy-on-write mechanism. Accordingly, D (424) is not overwritten; rather, a new block is allocated for D" (430). Thus, the storage pool (408) would include both a D (424) (which is accessible by R and CR1) and a D" (which is accessible only by CR2).

Figure 5:
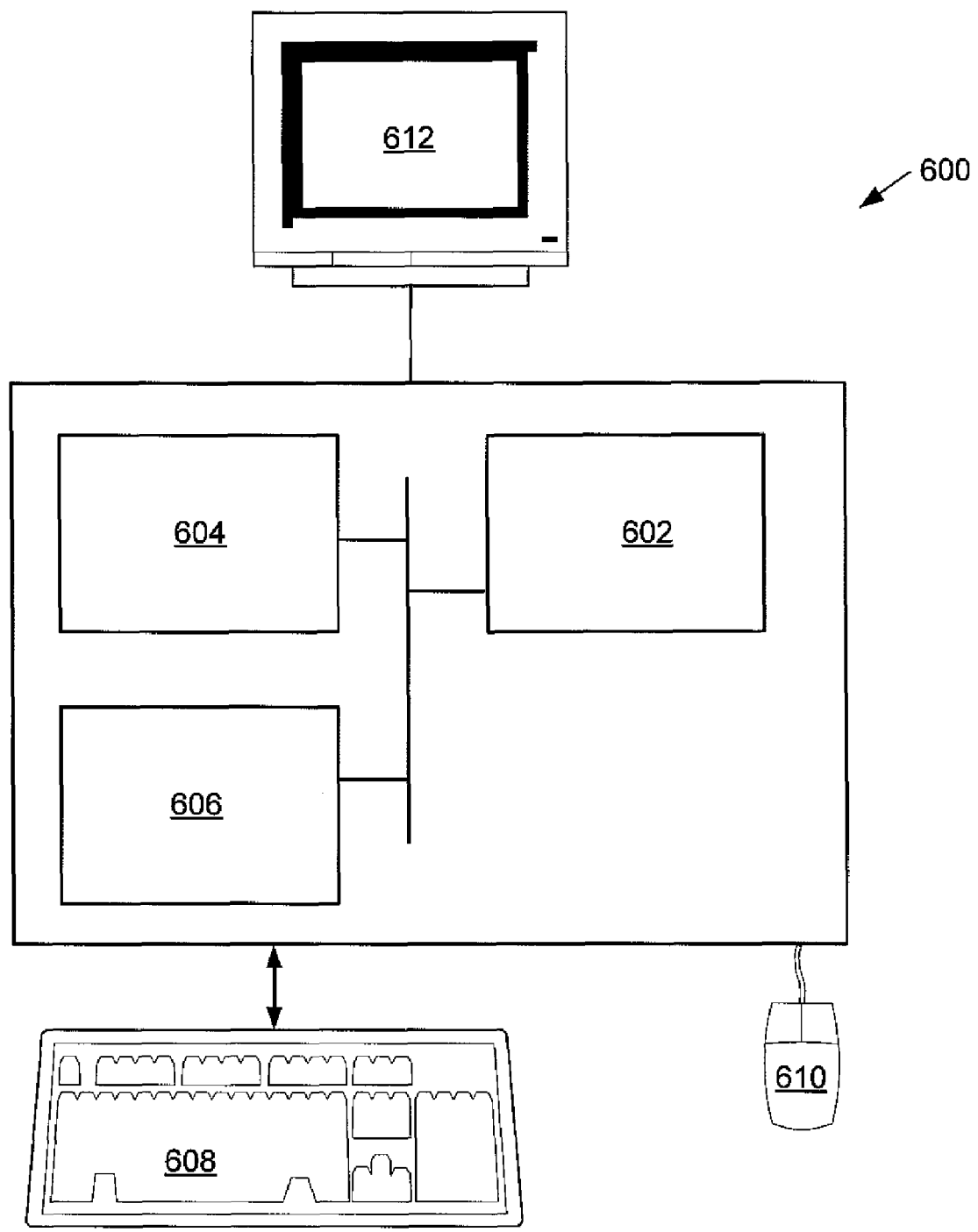
FIG. 5 shows a computer system in accordance with one or more embodiments of the invention.

FIG. 5 shows a computer system in accordance with one or more embodiments of the invention. The invention (or portions thereof), may be implemented on virtually any type of computer regardless of the platform being used. For example, as shown in FIG. 5, the computer system (600) may include a processor (602), associated memory (604), a storage device (606), and numerous other elements and functionalities typical of today's computers (not shown). The computer may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system may be located at a remote location and connected to the other elements over a network. Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for sharing data between a first domain and a second domain, comprising:
   issuing a first request for the data from a storage pool by the first domain, wherein the first request comprises a first pseudo-physical page number, wherein the first domain comprises a first domain address map, and wherein the first domain address map comprises an entry associating the first pseudo-physical page number with a first virtual memory address;
   receiving the first request by a control domain driver in a control domain;
   identifying, in response to the first request, a first clone of a hierarchical block tree, wherein the first clone corresponds to the first domain;
   traversing the first clone to determine that the data is not in shared memory;

obtaining, in response to determining that the data is not in the shared memory, the data from the storage pool by the control domain driver;

storing a first copy of the data in the shared memory at a first physical address, wherein the shared memory is accessible by the control domain, the first domain, and the second domain;

updating a hypervisor page map to include an entry associating the first pseudo-physical page number with the first physical address;

notifying the first domain that the first request has been completed;

issuing a second request for the data from the storage pool by the second domain, wherein the second request comprises a second pseudo-physical page number, wherein the second domain comprises a second domain address map, and wherein the second domain address map comprises an entry associating the second pseudo-physical page number with a second virtual memory address;

receiving the second request by the control domain driver in the control domain, wherein the second request comprises a requested metaslab identifier and a requested offset of the data;

identifying, in response to the second request, a second clone of the hierarchical block tree, wherein the second clone corresponds to the second domain;

traversing the second clone using the requested metaslab identifier and the requested offset;

determining, by the control domain driver while traversing the second clone, that the first copy of the data is present in the shared memory by identifying a match between the requested metaslab identifier and the requested offset and a data's metaslab identifier and a data's offset corresponding to the first copy of the data, wherein the first copy of the data is referenced in the second clone;

updating the hypervisor page map to include an entry associating the second pseudo-physical page number with the first physical address; and notifying the second domain that the second request has been completed, wherein the first domain and the second domain communicate with the control domain using a hypervisor.

2. The method of claim 1, further comprising:

issuing, to the control domain driver, a third request by the first domain to modify the first copy of the data in shared memory;

intercepting the third request by the hypervisor;

creating a second copy of the data;

storing the second copy of the data in a virtual memory allocated for the first domain at a second physical address;

updating the hypervisor page map to include an entry associating the second physical address with a third pseudo-physical page number;

updating the first domain address map to include an entry associating the third pseudo-physical page number with a third virtual address; and completing the third request using the second copy of the data.

3. The method of claim 2, wherein the data is accessible to the control domain using the hierarchical block tree;

wherein the data is accessible to the second domain using the second clone of the hierarchical block tree;

wherein the second copy of the data is accessible to the first domain using the first clone of the hierarchical block tree;

wherein the data is not accessible to the first domain; and wherein the data is one selected from a group consisting of a file and a portion of the file.

4. The method of claim 3, wherein the control domain, the first domain, and the second domain execute on a host computer comprising a main memory and operatively connected to the storage pool;

wherein the main memory comprises the shared memory and the virtual memory allocated for the first domain; and wherein the hierarchical block tree, the first clone of the hierarchical block tree, and the second clone of the hierarchical block tree are stored in the storage pool.

5. The method of claim 3, wherein the hierarchical block tree, the first clone of the hierarchical block tree, and the second clone of the hierarchical block tree are copy-on-write file systems.

6. The method of claim 1, further comprising:

updating a reference count associated with the first physical address to indicate that two domains reference the first physical address.

7. The method of claim 1, wherein the data is accessible to the control domain associated with the hierarchical block tree;

wherein the data is accessible to the first domain using the first clone of the hierarchical block tree;

wherein the data is accessible to the second domain using the second clone of the hierarchical block tree; and wherein the data is one selected from a group consisting of a file and a portion of a file.

8. The method of claim 7, wherein the control domain, the first domain, and the second domain execute on a host computer comprising a main memory and operatively connected to the storage pool;

wherein the main memory comprises the shared memory and a virtual memory allocated for the first domain; and wherein the hierarchical block tree, the first clone of the hierarchical block tree, and the second clone of the hierarchical block tree are stored in the storage pool.

9. The method of claim 8, wherein the hierarchical block tree, the first clone of the hierarchical block tree, and the second clone of the hierarchical block tree are copy-on-write file systems.

10. The method of claim 1, wherein the first domain executes a first type of operating system and the second domain executes a second type of operating system.

11. A computer readable medium comprising instructions executable by a processor for performing a method, the method comprising:

issuing a first request for data from a storage pool by a first domain, wherein the first request comprises a first pseudo-physical page number, wherein the first domain comprises a first domain address map, and wherein the first domain address map comprises an entry associating the first pseudo-physical page number with a first virtual memory address;

receiving the first request by a control domain driver in a control domain;

identifying, in response to the first request, a first clone of a hierarchical block tree, wherein the first clone corresponds to the first domain;

traversing the first clone to determine that the data is not in a shared memory;

obtaining, in response to determining that the data is not in the shared memory, the data from the storage pool by the control domain driver;

storing a first copy of the data in the shared memory at a first physical address, wherein the shared memory is accessible by the control domain, the first domain, and a second domain;

updating a hypervisor page map to include an entry associating the first pseudo-physical page number with the first physical address;

notifying the first domain that the first request has been completed;

issuing a second request for the data from the storage pool by the second domain, wherein the second request comprises a second pseudo-physical page number, wherein the second domain comprises a second domain address map, and wherein the second domain address map comprises an entry associating the second pseudo-physical page number with a second virtual memory address;

receiving the second request by the control domain driver in the control domain, wherein the second request comprises a requested metaslab identifier and a requested offset of the data;

identifying, in response to the second request, a second clone of the hierarchical block tree, wherein the second clone corresponds to the second domain;

traversing the second clone using the requested metaslab identifier and the requested offset;

determining, by the control domain driver while traversing the second clone, that the first copy of the data is present in the shared memory by identifying a match between the requested metaslab identifier and the requested offset and a data's metaslab identifier and a data's offset corresponding to the first copy of the data, wherein the first copy of the data is referenced in the second clone;

updating the hypervisor page map to include an entry associating the second pseudo-physical page number with the first physical address; and notifying the second domain that the second request has been completed, wherein the first domain and second domain communicate with the control domain using a hypervisor.

12. The computer readable medium of claim 11, further comprising instructions executable by the processor for performing the method, the method further comprising:

issuing, to the control domain driver, a third request by the first domain to modify the first copy of the data in shared memory;

intercepting the third request by the hypervisor;

creating a second copy of the data;

storing the second copy of the data in a virtual memory allocated for the first domain at a second physical address;

updating the hypervisor page map to include an entry associating the second physical address with a third pseudo-physical page number;

updating the first domain address map to include an entry associating the third pseudo-physical page number with a third virtual address; and completing the third request using the second copy of the data.

13. The computer readable medium of claim 12,
wherein the data is accessible to the control domain using the hierarchical block tree;
wherein the data is accessible to the second domain using the second clone of the hierarchical block tree;
wherein the second copy of the data is accessible to the first domain using the first clone of the hierarchical block tree;
wherein the data is not accessible to the first domain; and
wherein the data is one selected from a group consisting of a file and a portion of the file.

14. The computer readable medium of claim 13,
wherein the control domain, the first domain, and the second domain execute on a host computer comprising a main memory and operatively connected to the storage pool;
wherein the main memory comprises the shared memory and the virtual memory allocated for the first domain; and
wherein the hierarchical block tree, the first clone of the hierarchical block tree, and the second clone of the hierarchical block tree are stored in the storage pool.

15. The computer readable medium of claim 14, wherein the hierarchical block tree, the first clone of the hierarchical block tree, and the second clone of the hierarchical block tree are copy-on-write file systems.

16. The computer readable medium of claim 11, wherein the method further comprises:
updating a reference count associated with the first physical address to indicate that two domains reference the first physical address.

17. The computer readable medium of claim 11,
wherein the data is accessible to the control domain using the hierarchical block tree;
wherein the data is accessible to the first domain using the first clone of the hierarchical block tree;
wherein the data is accessible to the second domain using the second clone of the hierarchical block tree; and
wherein the data is one selected from a group consisting of a file and a portion of the file.

18. The computer readable medium of claim 17,
wherein the control domain, the first domain, and the second domain execute on a host computer comprising a main memory and operatively connected to the storage pool;
wherein the main memory comprises the shared memory and a virtual memory allocated for the first domain;
wherein the hierarchical block tree, the first clone of the hierarchical block tree, and the second clone of the hierarchical block tree are stored in the storage pool; and
wherein the hierarchical block tree, the first clone of the hierarchical block tree, and the second clone of the hierarchical block tree are copy-on-write file systems.

19. A system, comprising:
a processor;
a main memory comprising a shared memory;
a storage pool, wherein the storage pool comprises instructions executable by the processor to perform a method, the method comprising:
issuing a first request for data from a storage pool by a first domain, wherein the first request comprises a first pseudo-physical page number, wherein the first domain comprises a first domain address map, and wherein the first domain address map comprises an entry associating the first pseudo-physical page number with a first virtual memory address;
receiving the first request by a control domain driver in a control domain;
identifying, in response to the first request, a first clone of a hierarchical block tree, wherein the first clone corresponds to the first domain;

traversing the first clone to determine that the data is not in the shared memory;

obtaining, in response to determining that the data is not in the shared memory, the data from the storage pool by the control domain driver;

storing a first copy of the data in the shared memory at a first physical address, wherein the shared memory accessible by the control domain, the first domain, and a second domain;

updating a hypervisor page map to include an entry associating the first pseudo-physical page number with the first physical address;

notifying the first domain that the first request has been completed;

issuing a second request for the data from the storage pool by the second domain, wherein the second request comprises a second pseudo-physical page number, wherein the second domain comprises a second domain address map, and wherein the second domain address map comprises an entry associating the second pseudo-physical page number with a second virtual memory address;

receiving the second request by the control domain driver in the control domain, wherein the second request comprises a requested metaslab identifier and a requested offset of the data;

identifying, in response to the second request, a second clone of the hierarchical block tree, wherein the second clone corresponds to the second domain;

traversing the second clone using the requested metaslab identifier and the requested offset;

determining, by the control domain driver while traversing the second clone, that the first copy of the data is present in the shared memory by identifying a match between the requested metaslab identifier and the requested offset and a data's metaslab identifier and a data's offset corresponding to the first copy of the data, wherein the first copy of the data is referenced in the second clone;

updating the hypervisor page map to include an entry associating the second pseudo-physical page number with the first physical address; and notifying the second domain that the second request has been completed, wherein the first domain and second domain communicate with the control domain using a hypervisor.

20. The system of claim 19, wherein the data is accessible to the control domain using the hierarchical block tree;

wherein the data is accessible to the first domain using the first clone of the hierarchical block tree;

wherein the data is accessible to the second domain using the second clone of the hierarchical block tree;

wherein the data is one selected from a group consisting of a file and a portion of the file;

wherein the hierarchical block tree, the first clone of the hierarchical block tree, and the second clone of the hierarchical block tree are stored in the storage pool; and wherein the hierarchical block tree, the first clone of the hierarchical block tree, and the second clone of the hierarchical block tree are copy-on-write file systems.

* * * * *